United States Patent
Londarenko et al.

(10) Patent No.: US 10,938,071 B2
(45) Date of Patent: Mar. 2, 2021

(54) BATTERY CAN FEEDTHROUGH WITH INTEGRATED VENT

(71) Applicant: Apple Inc., Cupertino, CA (US)

(72) Inventors: Yuriy Y. Londarenko, San Jose, CA (US); Shabab Amiruddin, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 15/840,563

(22) Filed: Dec. 13, 2017

(65) Prior Publication Data

US 2019/0103638 A1  Apr. 4, 2019

Related U.S. Application Data

(60) Provisional application No. 62/565,482, filed on Sep. 29, 2017.

(51) Int. Cl.

| | |
|---|---|
| *H01M 2/04* | (2006.01) |
| *H01M 2/12* | (2006.01) |
| *H01M 2/30* | (2006.01) |
| *H01M 2/08* | (2006.01) |
| *H01M 10/0587* | (2010.01) |
| *H01M 2/10* | (2006.01) |
| *H01M 10/04* | (2006.01) |

(52) U.S. Cl.
CPC ..... *H01M 10/0587* (2013.01); *H01M 2/0413* (2013.01); *H01M 2/08* (2013.01); *H01M 2/105* (2013.01); *H01M 2/12* (2013.01); *H01M 2/1241* (2013.01); *H01M 2/30* (2013.01); *H01M 10/04* (2013.01); *H01M 2220/30* (2013.01); *Y02E 60/10* (2013.01)

(58) Field of Classification Search
CPC .................................................. H01M 2/1241
See application file for complete search history.

(56) References Cited

U.S. PATENT DOCUMENTS

| | | | |
|---|---|---|---|
| 4,939,050 A * | 7/1990 | Toyosawa | H01M 4/742 |
| | | | 429/241 |
| 5,154,989 A | 10/1992 | Howard et al. | |
| 2004/0131942 A1* | 7/2004 | Anglin | H01M 2/0202 |
| | | | 429/233 |
| 2005/0003268 A1 | 1/2005 | Scott et al. | |
| 2010/0136387 A1* | 6/2010 | Kohn | H01M 2/30 |
| | | | 429/56 |
| 2014/0099533 A1 | 4/2014 | Hartl | |
| 2018/0159100 A1* | 6/2018 | Lee | H01M 2/046 |

FOREIGN PATENT DOCUMENTS

JP  4339923 B * 7/2009

* cited by examiner

*Primary Examiner* — Jonathan Crepeau
(74) *Attorney, Agent, or Firm* — Polsinelli PC

(57) ABSTRACT

The disclosed technology relates to a battery cell that includes a battery can having a receptacle and a cover. The battery cell also includes multiple electrode layers that are disposed within the receptacle, wherein a first layer of the plurality of electrode layers is coupled to the cover, and a second layer of the plurality of electrode layers is coupled to the receptacle. In some aspects, the cover includes a conductive feedthrough having a vent. A battery-powered device and method of manufacturing a battery cell are also provided.

15 Claims, 5 Drawing Sheets

BATTERY CAN FEEDTHROUGH WITH INTEGRATED VENT

PRIORITY

This application claims the benefit under 35 U.S.C. § 119(e) of U.S. Provisional Patent Application Ser. No. 62/565,482, entitled "BATTERY CAN FEEDTHROUGH WITH INTEGRATED VENT," filed on Sep. 29, 2017, which is incorporated herein by reference in its entirety.

TECHNICAL FIELD

The present disclosure relates generally to battery cells and more particularly, to a battery can that includes a cover with an integrated conductive feedthrough and vent.

BACKGROUND

Battery cells are used to provide power to a wide variety of portable electronic devices, including laptop computers, tablet computers, smart phones, personal digital assistants (PDAs), digital music players, watches, and wearable devices. Depending on the desired implementation, the battery cell may be enclosed in a can or pouch that determines the shape of the cell. In some battery configurations, a feedthrough connected to tabs on various electrode layers within the can is configured to pass through an opening in the can surface, for example, to provide an electrical terminal to the outside of the battery cell enclosure.

SUMMARY

The disclosed embodiments provide a battery cell including a battery can having a receptacle and a cover. The receptacle of the battery can contains electrode layers that include a first layer of electrode sheets that are coupled to the cover, and a second layer of electrode sheets that are coupled to the receptacle. In some embodiments, the cover also includes a conductive feedthrough that has a vent.

In another aspect, the disclosure relates to a battery-powered electronic device that includes a chassis configured to enclose a battery pack. The battery pack is disposed within the chassis, and includes a battery can having a receptacle and a cover, and multiple electrode layers disposed within the receptacle. A first layer of the electrode sheets is coupled to the cover, and a second layer of the electrode sheets is coupled to the receptacle, wherein the cover includes a conductive feedthrough, and wherein the conductive feedthrough includes a vent.

In yet another aspect, the disclosure relates to a method for manufacturing a battery pack, the method includes steps for inserting electrode layers into a receptacle of a battery can, coupling a first layer of the electrode sheets to a cover of the battery can, and coupling a second layer of the electrode sheets to the receptacle. In some embodiments, the cover includes a conductive feedthrough having a vent.

BRIEF DESCRIPTION OF THE DRAWINGS

The embodiments disclosed herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the technology.

Battery cells can consist of multiple electrode layers disposed inside an enclosure, such as a pouch, or can (i.e., a "battery can"). Cylindrical cells are typically those that have a cylindrically shaped can, whereas prismatic cells have a substantially rectangular pouch or can shape.

One challenge in battery cell manufacturing is to construct enclosures that prevent moisture from reaching electrode layers within the can. Moisture leaks are particularly problematic for lithium-ion and lithium-polymer batteries, in which even small amounts of moisture can degrade performance. Moisture leaks are most likely at junctions between different battery components, such as the parts of a battery's can.

Another challenge of battery cell manufacturing is to effectively release effluent, such as electrolyte vapors, that may build up in an internal volume of the can into the external environment. In some conventional designs, holes are drilled through the can and filled with a pliable material, such as plastic, that is configured to release pressure while preventing moisture from penetrating the can enclosure.

As device miniaturization continues to drive the necessity for smaller battery sizes, manufacturing of effective feedthroughs and vents has become increasingly difficult. Aspects of the subject technology address the foregoing concerns by providing a battery can that includes a receptacle and a cover containing a feedthrough. By integrating the feedthrough into the cover, the cover and feedthrough dimensions can be reduced without compromising the seal around the feedthrough. As discussed below, reductions in battery can dimension can be further benefited by the integration of a vent into the conductive feedthrough.

Figure 1A:
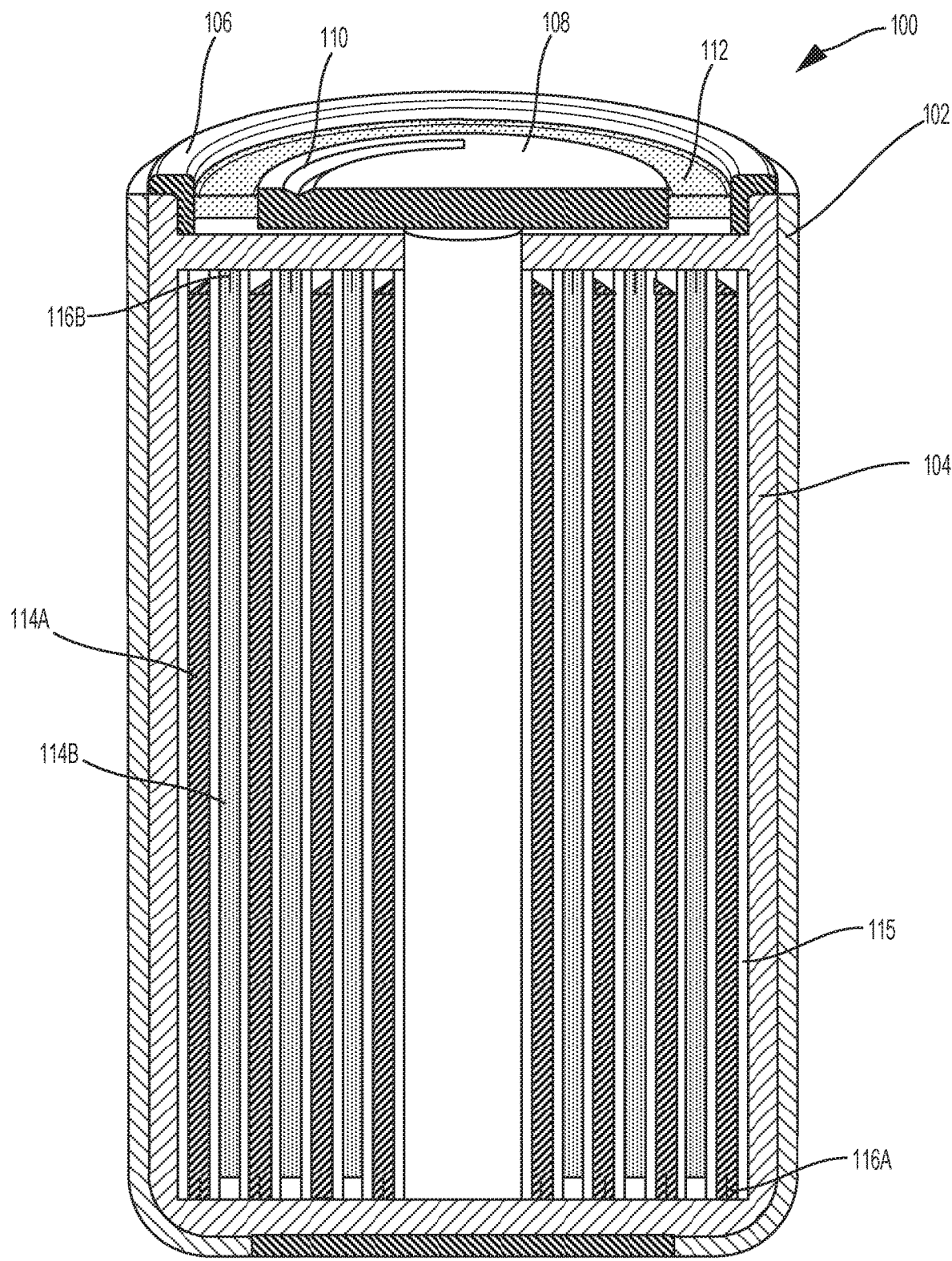
FIG. 1A illustrates a cut-away side view of an example battery cell, according to some aspects of the subject technology.

FIG. 1A illustrates an example side cut-away view of a battery cell 100. Battery cell 100 includes a battery can 102 that is formed by the coupling of receptacle 104 and cover 106. Cover 106 includes a conductive feedthrough 108, a vent 110 that is disposed on conductive feedthrough 108, and a seal 112 that electrically isolates conductive feedthrough 108 from an edge of cover 106 and receptacle 104.

An internal volume of can 102 contains multiple electrode layers 114 that provide the charge storage capability of battery cell 100. In particular, electrode layers 114 include first and second layers of electrode sheets (114A and 114B)

having opposite electrical polarity. First and second layers are interleaved by separators 115, which electrically insulate the various electrode sheets. In the illustrated example, first layer 114A may represent anode layers associated with an electrical negative (−), and second layer 114B may represent cathode layers associated with an electrical positive (+), respectively. However, it is understood that first layer 114A may correspond with an electrical positive, and second layer 114B may correspond with an electrical negative, without departing from the scope of the technology.

One set of electrode layers can be electrically coupled to receptacle 104, whereas the other set can be electrically coupled to conductive feedthrough 108. In this manner, conductive feedthrough 108, and receptacle 104 can function as (electrically opposite) terminals of battery 100. In the illustrated example, first layer 114A is coupled to receptacle 104 via electrodes 116A, whereas second layer 114B is coupled to conductive feedthrough 108 via electrodes 116B.

In practice, cover 106 is welded onto an opening of receptacle 104, enclosing electrode layers 114 within the inner volume of receptacle 104. Seal 112 provides electrical isolation between conductive feedthrough 108 and an edge of cover 106 that is welded to receptacle 104, thereby separating electrical terminals of battery 100 so that battery cell does not short. In some embodiments, seal 112 is a hermetic seal configured to resist the transfer of moisture past conductive feedthrough 108, preventing the admittance of moisture into an internal volume of battery 100 that may compromise battery performance. By way of example, seal 112 may be constructed of an electrically insulative material, such as glass, ceramic, rubber, or plastic, etc.

Conductive feedthrough 108 further includes vent 110 that is configured to open when pressure within can 102 exceeds a threshold. The opening of vent 110 can permit the release of effluents, such as gas electrolyte vapors, from an internal volume of battery cell 100. The pressure threshold needed to open vent 110 can vary depending on the geometry and depth of the vent etching, as well as the desired implementation. For example, vent 110 may be configured to open between 3 to 5 PSI. In other implementations, vent 110 may be configured to open if an internal pressure within can 102 exceeds a threshold between 10 and 20 PSI. By way of example, vent 110 may be configured to open if an internal pressure of can 102 exceeds 15 PSI.

In other embodiments, a predetermined pressure threshold needed to open vent 110 may be relatively higher. By way of example, the pressure threshold to open vent 110 may be configured to be between 200 and 400 PSI. In some aspects, the pressure threshold may be approximately 300 PSI.

In the illustration of FIG. 1A, vent 110 is illustrated as a notch etched onto a surface of conductive feedthrough 108, but that does not penetrate conductive feedthrough 108 into the interior volume of can 102. However, it is understood that vent 110 may be disposed at different locations, such as on an interior surface of conductive feedthrough 108, without departing from the technology. Additionally, it is understood that vent 110 can be different shapes and/or sizes depending on the desired implementation.

Figure 1B:
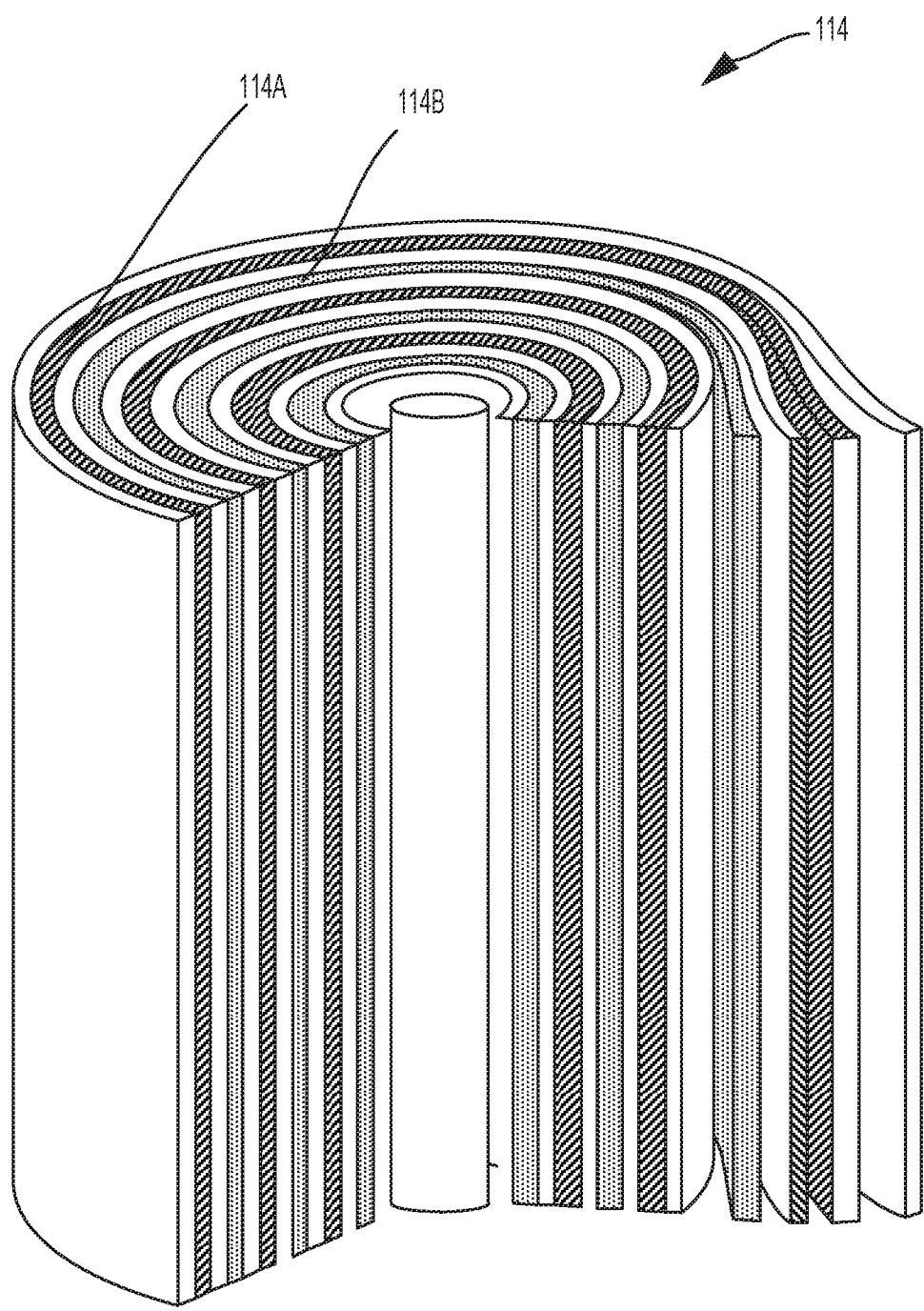
FIG. 1B illustrates an example of an electrode layer configuration, according to some aspects of the technology.

FIG. 1B illustrates an example configuration of electrode layers 114. Specifically, in the example of FIG. 1B, electrode layers 114 are rolled to form a "jelly roll," configuration. However, other configurations of electrode layers 114 are possible, without departing from the scope the technology. For example, electrode layers 114 may be stacked, without departing from the technology.

Additionally, in the example of FIG. 1A, can 102 is illustrated to form a cylindrical shape, e.g., for a cylindrical cell type battery. However, other geometries are contemplated. Can 102 may configured in a rectangular prism shape, for example, forming a prismatic cell, without departing from the technology. In such configurations, cover 106 may be configured to accommodate the geometry of the associated receptacle 104. For example, if can 102 forms a prismatic cell, receptacle 104 and cover 106 may be substantially rectangular in shape.

Figure 2:
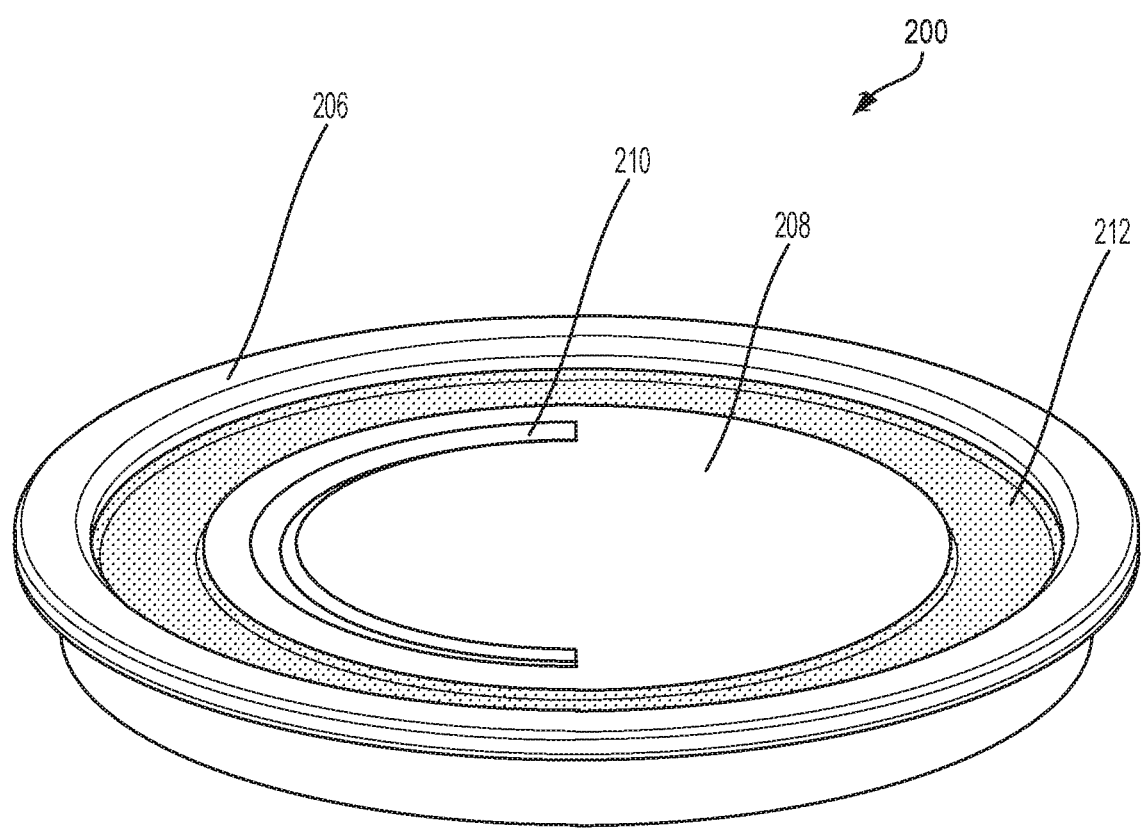
FIG. 2 illustrates a perspective view of a cover for a battery can, including an integrated conductive feedthrough and vent, according to some aspects of the technology.

FIG. 2 illustrates a perspective view of a cover 200 for a battery can, including an integrated edge 206, which is separated from conductive feedthrough 208 by seal 212. Similar to the example of FIG. 1, cover 200 is configured for a cylindrical cell, e.g., to be welded to a circular opening of a receptacle 206 (not illustrated), around edge 206. However, other geometries are contemplated; for example, cover 200 may be a rectangular or square shape, without departing from the technology.

As discussed above, conductive feedthrough 208 can function as an electrical terminal, and is electrically isolated from edge 206 by seal 212. Seal 212 can be a hermetic seal that is configured to prevent the passage of moisture. By way of example, seal 212 can be comprised various materials, such as glass, ceramic, plastic, rubber, and/or silicone, etc.

Conductive feedthrough 208 includes vent 210 that is configured to open to permit the escape of effluents such as gas and/or solids from an internal volume of a battery can (not illustrated). Vent 210 can be etched into a surface of conductive feedthrough 208. As discussed above, the dimensions, shape and/or location of vent 210 may depend on the desired implementation, as well as other factors, such as a predetermined pressure threshold under which the vent is configured to open.

Figure 3:
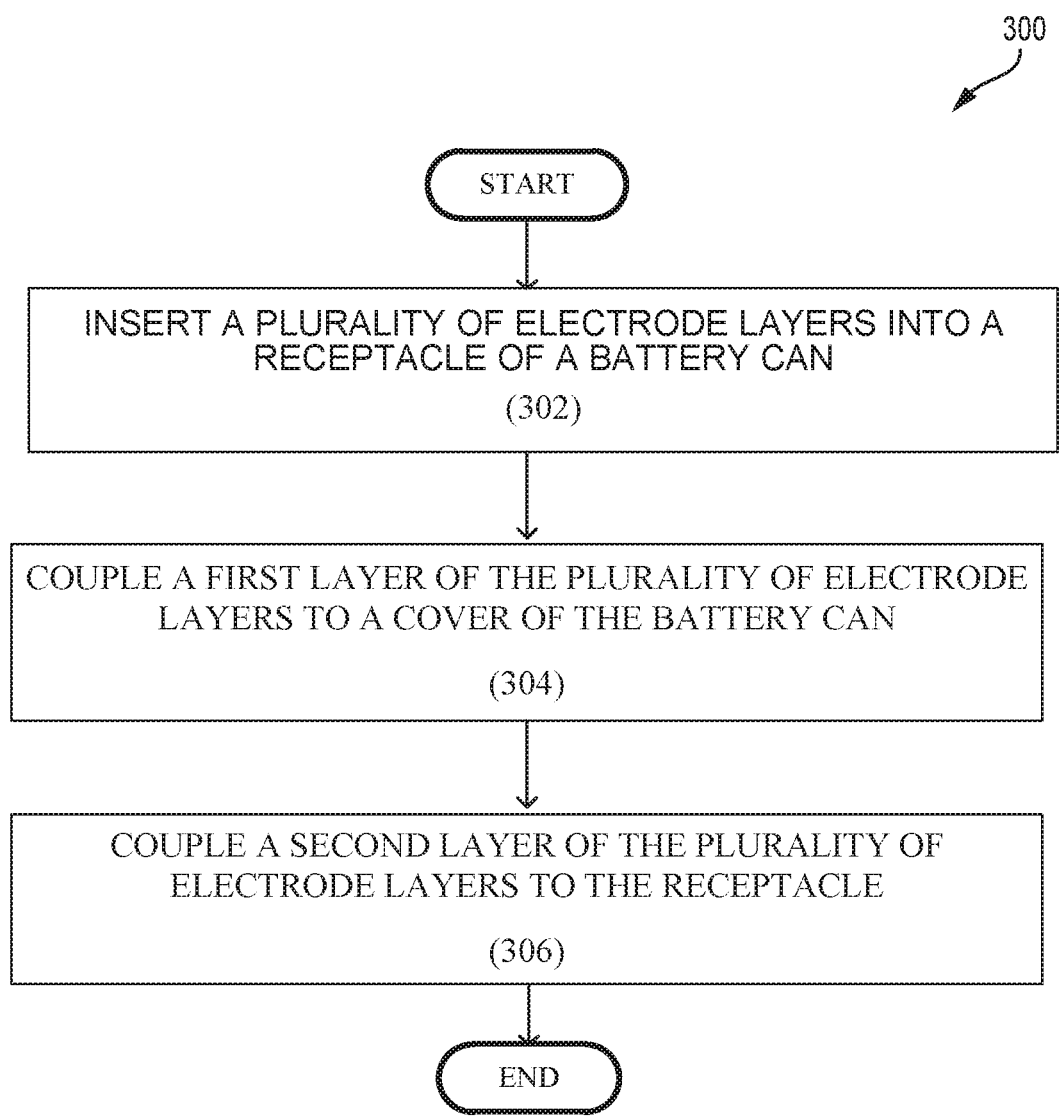
FIG. 3 illustrates an example process for manufacturing a battery cell, according to some aspects of the technology.

FIG. 3 illustrates an example process 300 for manufacturing a battery cell. Process 300 begins with step 302 in which a plurality of electrode layers are inserted into a battery can receptacle. As discussed above, a configuration of the electrode layers can vary depending on implementation. For example, as illustrated above with respect to FIG. 1B, the various electrode layers may be rolled, e.g., to form a jelly roll. In other configurations, the electrode layers may be stacked.

In step 304, a first layer of the plurality of electrode layers is coupled to the cover of the battery can. In some implementations, the first layer of the plurality of electrode layers can be electrically coupled to a conductive feedthrough integrated into the cover. As such, the conductive feedthrough can correspond with the electrical polarity of the first layer of the plurality of electrode layers In some aspects, the cover can include a hermetic seal that encircles the conductive feedthrough, for example, to provide electrical isolation between the conductive feedthrough and an edge of the cover. As discussed above, the hermetic seal, which may be constructed of glass or ceramic, can function to prevent moisture or other fluid exchange between an external volume of the can an internal volume once the cover has been sealed onto the receptacle.

In some aspects, the conductive feedthrough can include a vent, for example, that is notched into a top or bottom surface of the conductive feedthrough. The vent may form a semi-circular shape; however, the shape and/or dimension of the vent can vary depending on the desired implementation. The vent can be configured to open in response to a buildup of pressure within the can. In some aspects, the vent may be configured to open if the internal pressure of the can exceeds a predetermined threshold.

In step 306, a second layer of the plurality of electrode layers can be coupled to the receptacle. Similar to embodiments discussed above, the receptacle can operate as an electrical terminal of the battery, where the electrical polarity of the receptacle corresponds with the electrical polarity of the second electrode layers. In the foregoing example configuration, if the first layer of the plurality of electrode layers consists of anode sheets, then the conductive feedthrough may correspond with a negative electrical terminal of the battery; similarly, if the second layer of the plurality of electrode layers comprises cathode sheets, the receptacle may correspond with a positive terminal, and vice versa.

Once the electrode layers have been electrically coupled to the conductive feedthrough and the receptacle, the cover can be fastened over an opening of receptacle, enclosing the electrode layers in an internal volume of the battery can.

Figure 4:
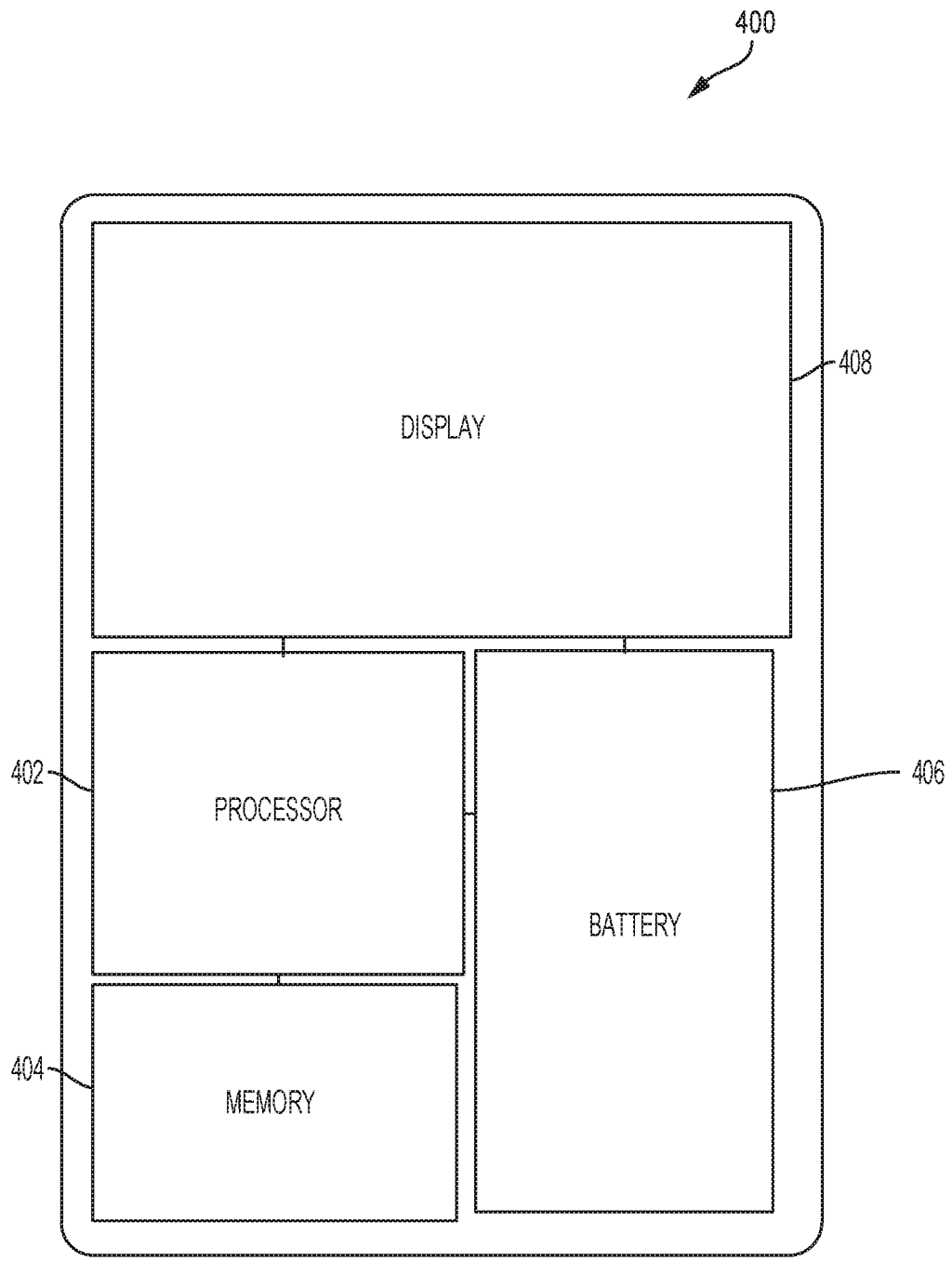
FIG. 4 illustrates a portable electronic device, in accordance with some aspects of the subject technology.

FIG. 4 illustrates a portable electronic device 400, including a battery pack 406, in accordance with various aspects of the described technology. Battery pack 406 can generally be used in any type of electronic device. For example, FIG. 4 illustrates a portable electronic device 400 that includes a processor 402, a memory 404 and a display 408, which are all powered by battery pack 406. Electronic device 400 can correspond to a laptop computer, tablet computer, mobile phone, personal digital assistant (PDA), digital music player, watch, wearable device, and/or other type of battery-powered electronic device. Battery 406 may correspond to a battery pack that includes one or more battery cells, such as first and second prismatic cells, as discussed above.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A battery cell, comprising:
    a battery can having a receptacle and a cover; and
    a plurality of electrode layers disposed within the receptacle, wherein a first layer of the plurality of electrode layers is coupled to the cover, and wherein a second layer of the plurality of electrode layers is coupled to the receptacle,
    wherein the cover comprises a conductive feedthrough and an integrated edge surrounding the conductive feedthrough, wherein the conductive feedthrough and the integrated edge are separated by a seal, and wherein the integrated edge is welded to an open end of the receptacle to enclose the plurality of electrode layers within the receptacle,
    wherein the conductive feedthrough comprises a solid feedthrough and a vent, the vent comprising a notch etched onto a surface of the conductive feedthrough, and
    wherein the conductive feedthrough, integrated edge, seal, and vent are integrally formed into a single component.

2. The battery cell of claim 1, wherein the vent is configured to open when pressure in an internal volume of the battery can exceeds a threshold, and wherein the vent, when open, permits release of effluents from the internal volume to an exterior of the battery cell.

3. The battery of claim 1, wherein the plurality of electrode layers are wound to form a jelly roll.

4. The battery of claim 1, wherein the plurality of electrode layers are stacked.

5. The battery cell of claim 1, wherein the battery cell is a cylindrical cell.

6. The battery cell of claim 1, wherein the battery cell is a prismatic cell.

7. The battery cell of claim 1, wherein, the first layer of the plurality of electrode layers comprises at least one anode layer.

8. The battery cell of claim 1, wherein, the second layer of the plurality of electrode layers comprises at least one cathode layer.

9. A battery-powered electronic device, comprising:
    a chassis configured to enclose a battery pack; and
    a battery pack disposed within the chassis, the battery pack comprising:
        a battery can having a receptacle and a cover; and
        a plurality of electrode layers disposed within the receptacle, wherein a first layer of the plurality of electrode layers is coupled to the cover, and wherein a second layer of the plurality of electrode layers is coupled to the receptacle, wherein the cover comprises a conductive feedthrough and an integrated edge surrounding the conductive feedthrough, wherein the conductive feedthrough and the integrated edge are separated by a seal, and wherein the integrated edge is welded to an open end of the receptacle to enclose the plurality of electrode layers within the receptacle, wherein the conductive feedthrough comprises a solid feedthrough and a vent, the vent comprising a notch etched onto a surface of the conductive feedthrough, and wherein the conductive feedthrough, integrated edge, seal, and vent are integrally formed into a single component.

10. The battery-powered electronic device of claim 9, wherein the vent is configured to open when pressure in an internal volume of the battery can exceeds a threshold, and wherein the vent, when open, permits release of effluents from the internal volume to an exterior of the battery cell.

11. The battery-powered electronic device of claim 9, wherein the seal electrically insulates the feedthrough from the receptacle.

12. The battery-powered electronic device of claim 9, wherein the plurality of electrode layers are wound to form a jelly roll.

13. The battery-powered electronic device of claim 9, wherein the plurality of electrode layers are stacked.

14. The battery-powered electronic device of claim 9, wherein the battery cell is a cylindrical cell.

15. A method for manufacturing a battery pack, the method comprising:

inserting a plurality of electrode layers into a receptacle of a battery can;

coupling a first layer of the plurality of electrode layers to a cover of the battery can; and coupling a second layer of the plurality of electrode layers to the receptacle, and wherein the cover comprises a conductive feedthrough and an integrated edge surrounding the conductive feedthrough, wherein the conductive feedthrough and the integrated edge are separated by a seal, and wherein the integrated edge is welded to an open end of the receptacle to enclose the plurality of electrode layers within the receptacle, wherein the conductive feedthrough comprises a solid feedthrough and a vent, the vent comprising a notch etched onto a surface of the conductive feedthrough, and wherein the conductive feedthrough, integrated edge, seal, and vent are integrally formed into a single component.

* * * * *